United States Patent [19]
Kinumoto et al.

[11] Patent Number: 4,950,446
[45] Date of Patent: Aug. 21, 1990

[54] METHOD OF LINING PIPES

[75] Inventors: Namio Kinumoto, Osaka; Toshihiko Kikuchi, Nagaokakyo; Akeshi Kegasa, Kobe, all of Japan

[73] Assignees: Osaka Gas Company Inc.; Osaka Bosui Construction Co., Ltd., both of Osaka, Japan

[21] Appl. No.: 251,650

[22] PCT Filed: Dec. 24, 1987

[86] PCT No.: PCT/JP87/01027
§ 371 Date: Aug. 19, 1988
§ 102(e) Date: Aug. 19, 1988

[87] PCT Pub. No.: WO88/04987
PCT Pub. Date: Jul. 14, 1988

[30] Foreign Application Priority Data

Dec. 26, 1986 [JP] Japan .................. 61-311000
Feb. 19, 1987 [JP] Japan .................. 62-36998
Apr. 13, 1987 [JP] Japan .................. 62-91677
May 15, 1987 [JP] Japan .................. 62-119837
Jul. 27, 1987 [JP] Japan .................. 62-188198

[51] Int. Cl.⁵ .............................. B29C 63/20
[52] U.S. Cl. ......................... 214/516; 138/97; 156/287; 156/294; 264/573; 264/269; 264/DIG. 65
[58] Field of Search ............ 264/36, 516, DIG. 65, 264/269, 270, 571, 573; 156/286, 287, 294; 425/11; 130/97

[56] References Cited

U.S. PATENT DOCUMENTS 3,560,295 2/1971 Kimbrell et al. ............ 264/516
4,496,499 1/1985 Brittain et al. ............ 264/516

FOREIGN PATENT DOCUMENTS 1394807  3/1965  France .
55-31473 3/1980  Japan .
58-24679 2/1983  Japan .
58-88281 5/1983  Japan .
58-39847 10/1983 Japan .
2018384 10/1979 United Kingdom .

Primary Examiner—Jan H. Silbaugh
Assistant Examiner—Mathieu Vargot
Attorney, Agent, or Firm—Armstrong, Nikaido, Marmelstein, Kubovcik & Murray

[57] ABSTRACT

A method of lining a pipe with a rigid plastic tube inserted in the pipe by enlarging the tube from inside with application of heat and pressure. The method includes enlarging the tube by an electrically heatable enlarging pig moved through the tube, retaining the enlarged portion of the plastic tube with compressed air supplied to the interior of the tube, and preheating the unenlarged portion of the plastic tube with a portion of the compressed air heated by being passed through air heating channels of the pig. The use of the pig eliminates the material limitations to be otherwise imposed on the tube, and therefore the softening point, of the plastic tube. The preheating of the unenlarged portion of the plastic tube renders the pig movable through the tube at an increased speed to achieve an improved work efficiency.

10 Claims, 10 Drawing Sheets

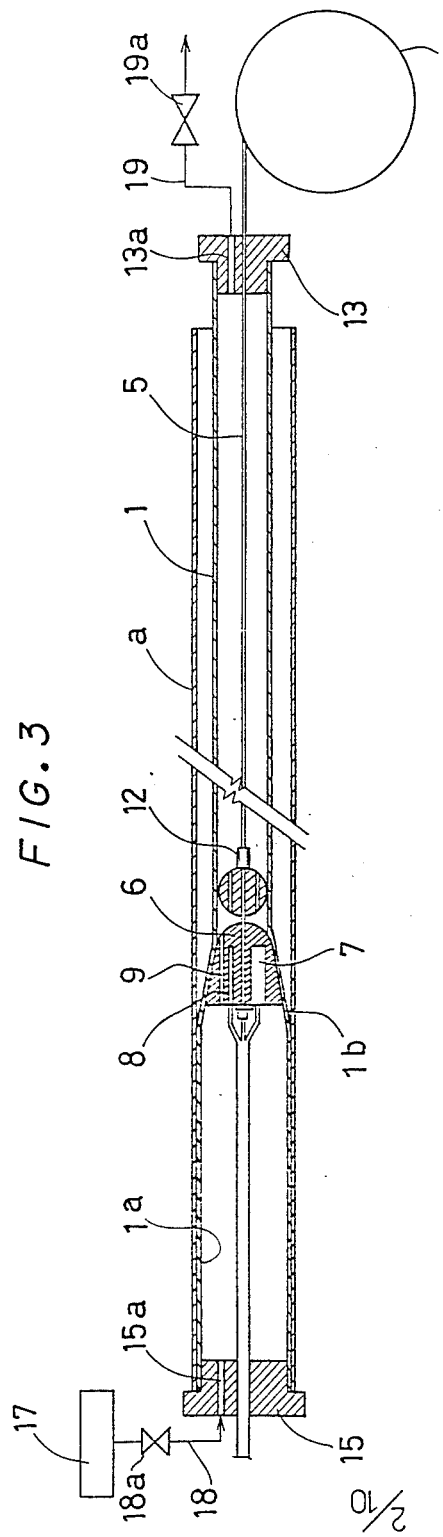

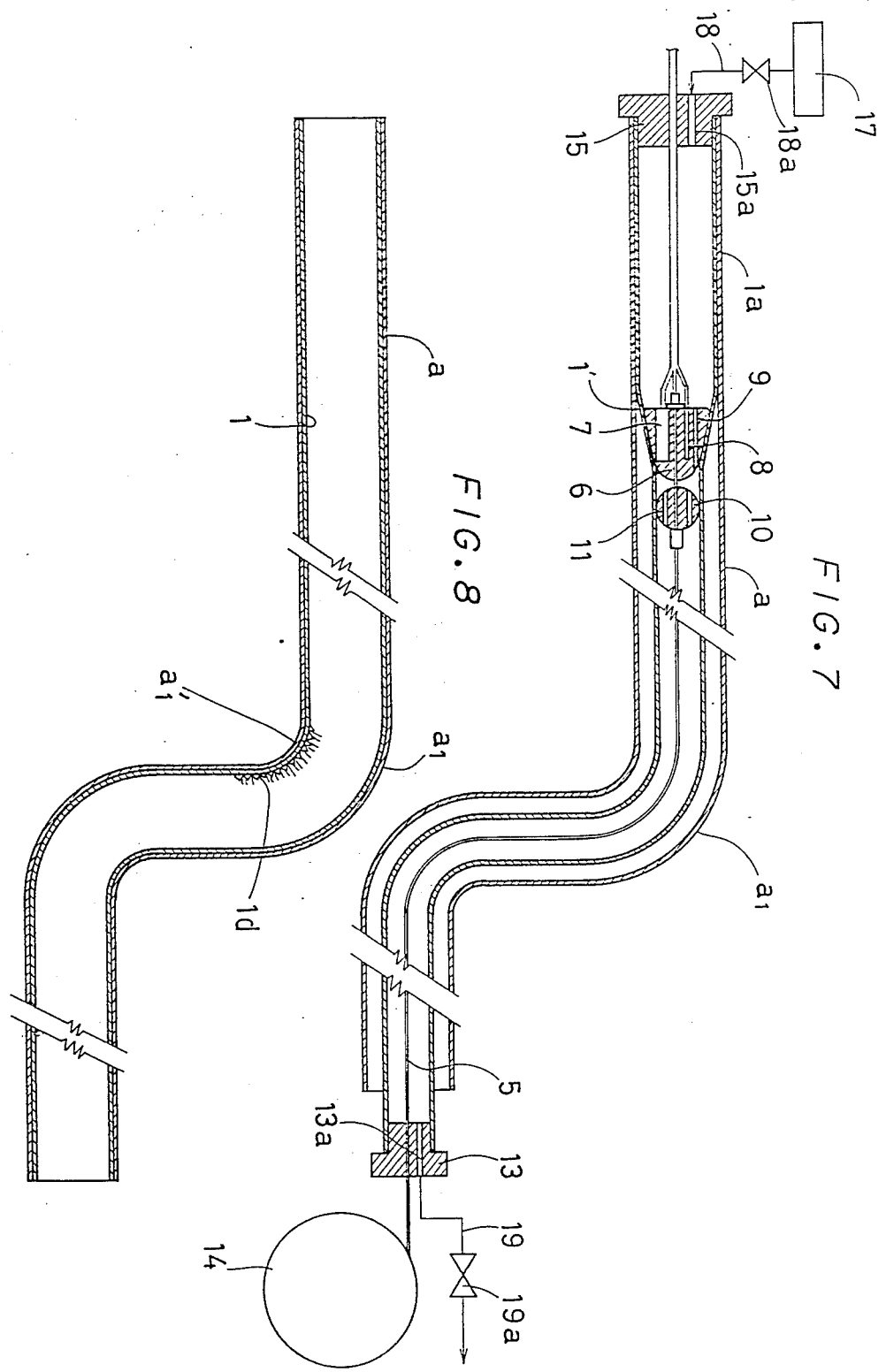

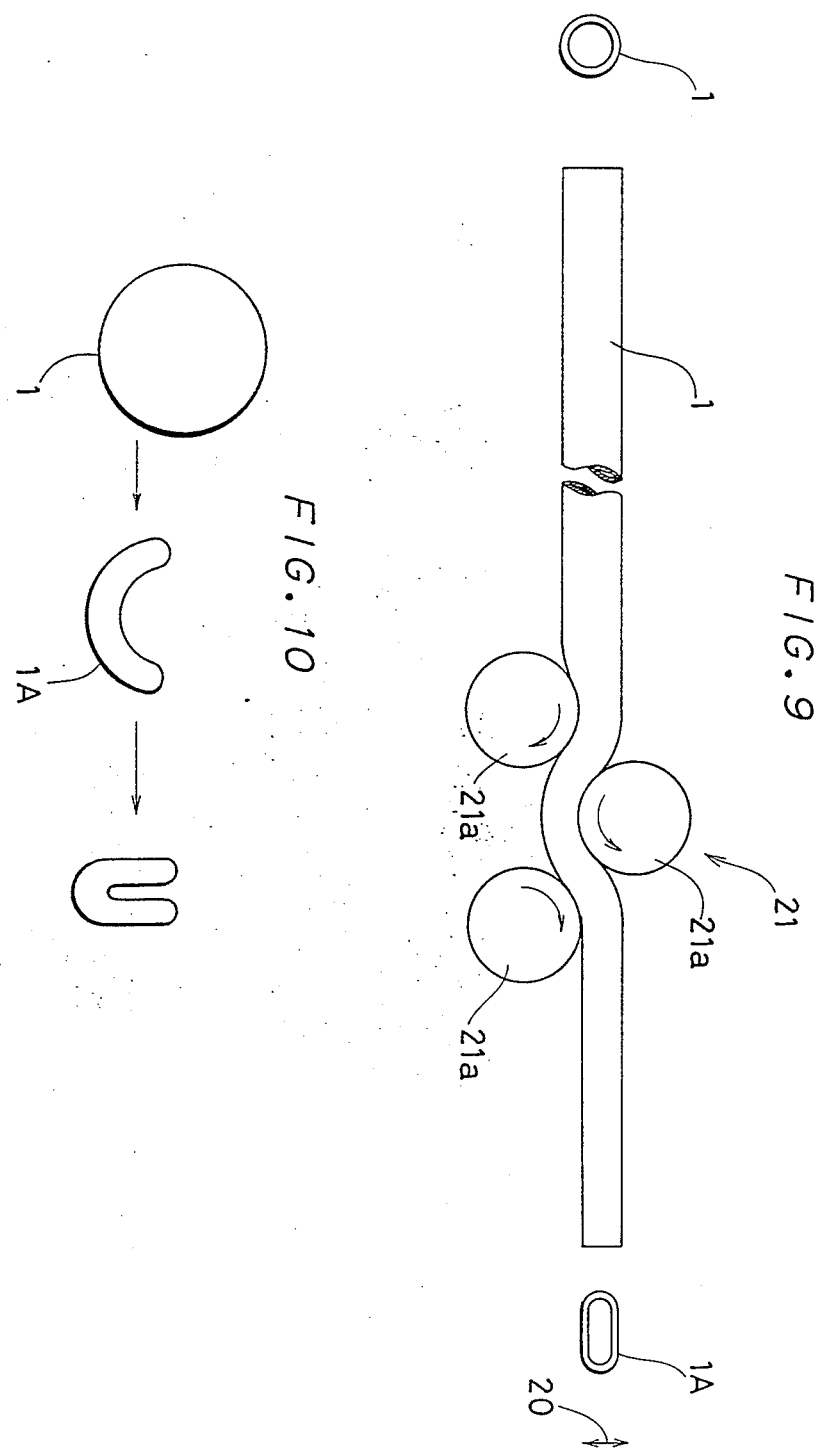

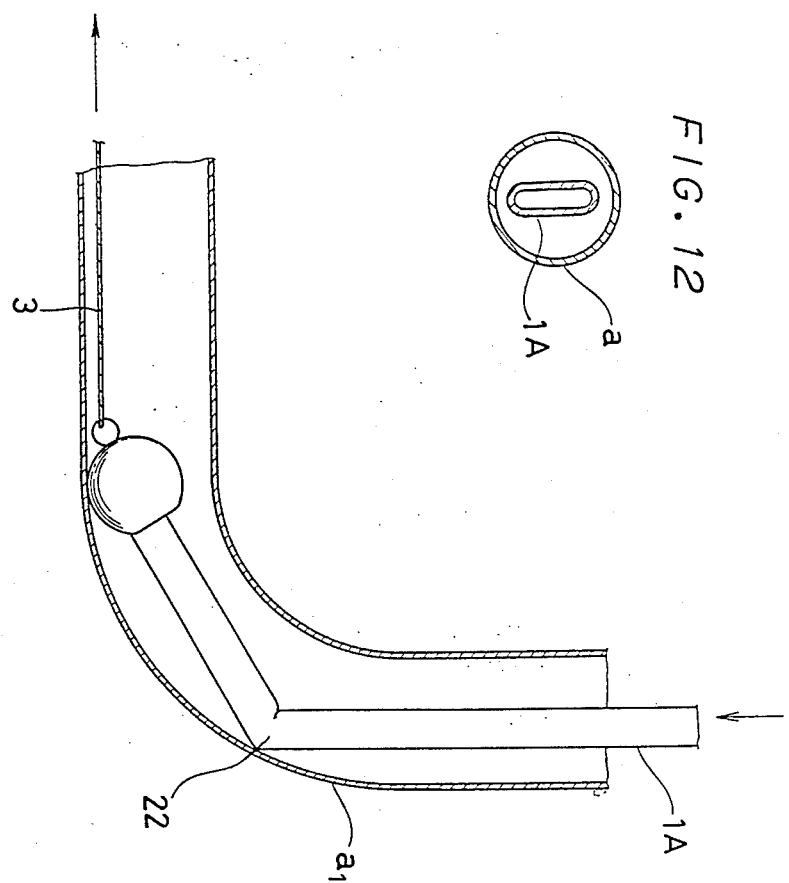

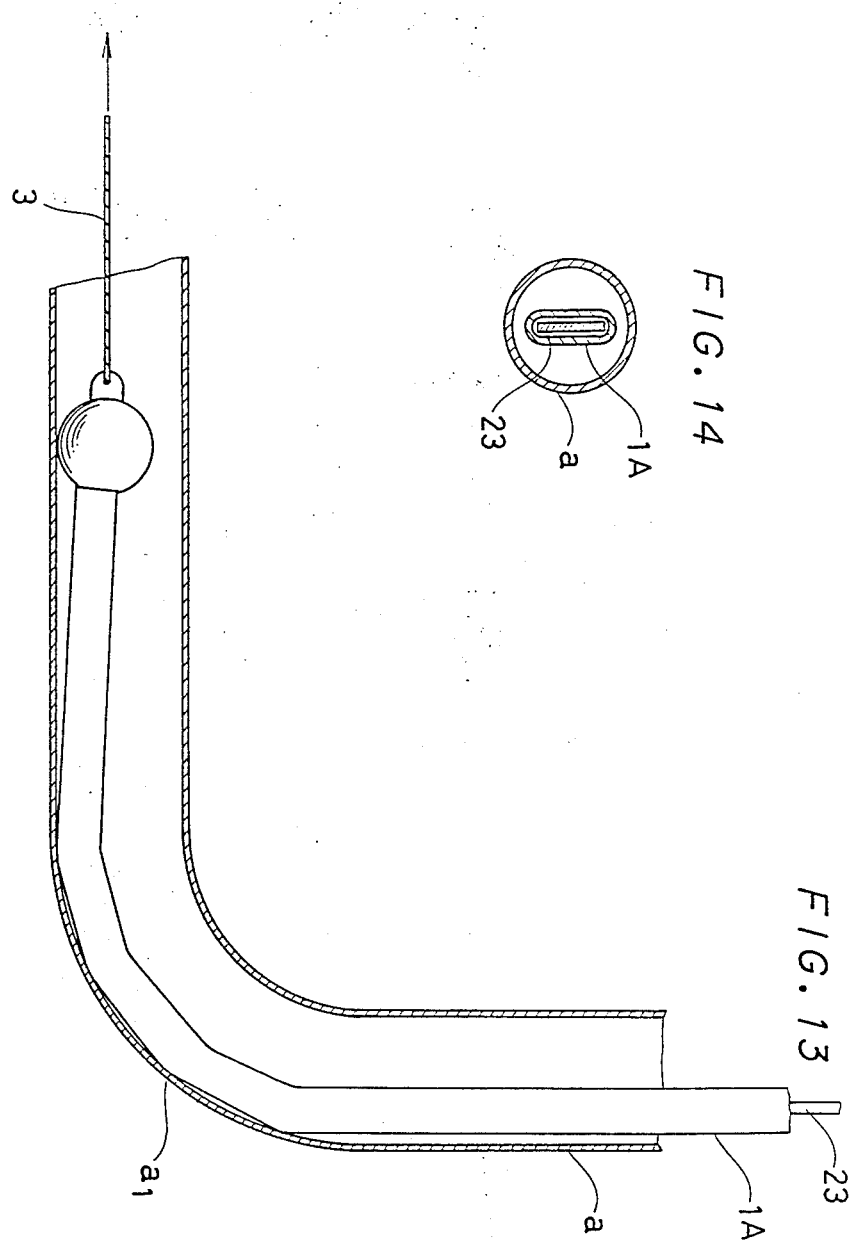

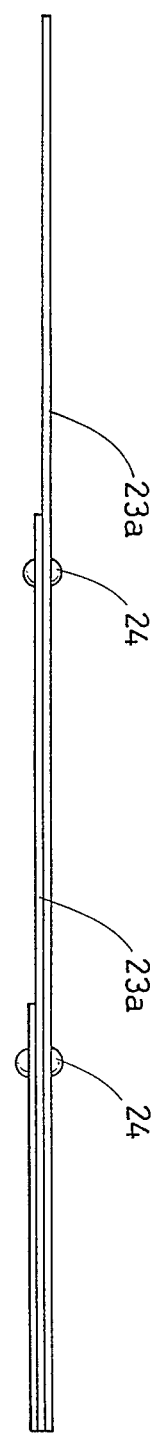
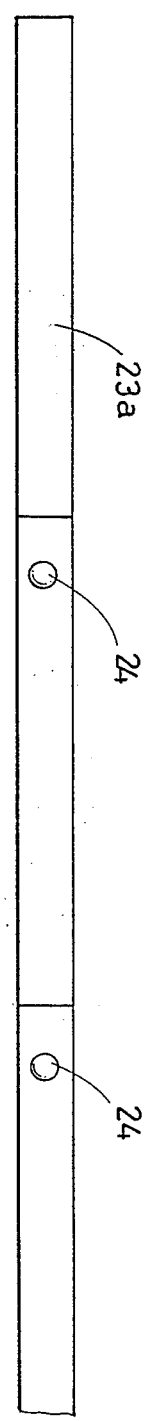
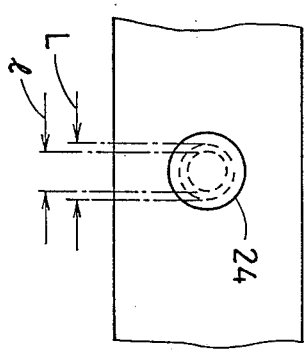
FIG. 15
FIG. 16
FIG. 17

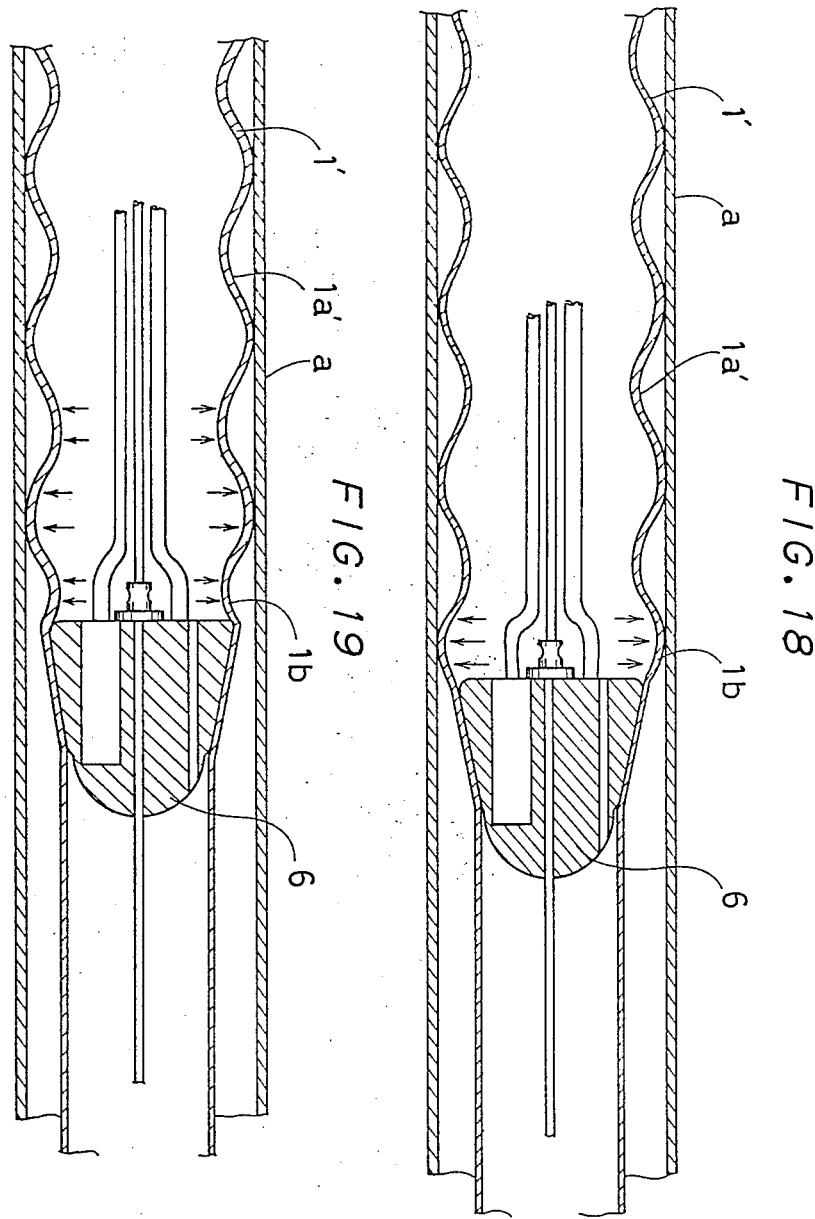

4,950,446

METHOD OF LINING PIPES

TECHNICAL FIELD

The present invention relates to a method of lining pipes, and more particularly to a method of lining a pipe with a rigid or semi-rigid plastic tube inserted in the pipe by enlarging the tube radially thereof from inside the tube by the application of heat and pressure to form a lining.

BACKGROUND ART

As apparent, for example, from Unexamined Japanese Patent Publication No. 88281/1983, a method is already well known of lining a pipe by forming a lining from a rigid or semi-rigid plastic tube enlarged within the pipe.

When such a known method of lining a pipe with a plastic tube inserted in the pipe by enlarging the tube is so adapted that the tube is enlarged progressively from the starting end toward the terminal end, the air present between the inner surface of the pipe and the outer peripheral surface of the plastic tube is properly discharged toward the terminal end with the progress of enlargement of the plastic tube. The method then gives a lining of high quality without trapping air.

The known lining method employs a fluid of high temperature as means for applying heat and pressure to enlarge the plastic tube. However, if the high-temperature fluid is supplied directly to the interior of the plastic tube, heat and pressure are applied to the entire length of the tube substantially at the same time to enlarge the tube. Air is then liable to remain between the pipe and the lining, making it impossible to form a lining of high quality.

In this case, the plastic tube can be enlarged progressively by providing a pig inside the plastic tube and applying heat and pressure to the plastic tube with the movement of the pig through the tube, with the high-temperature fluid supplied to the interior thereof as disclosed in the foregoing prior-art publication. Nevertheless, the high-temperature fluid, if used in combination with the pig, is unable to heat the portion of the plastic tube toward the direction of advance of the pig, with the result that the pig fails to move through the tube smoothly and inevitably slows down to make the lining operation inefficient. Most suitably, the high-temperature fluid is steam since steam has a great heat capacity and condenses to pure water which does not contaminate the lining, but the use of steam at an increased internal pressure to give a high temperature renders the operation hazardous. In view of the safety of the operation, therefore, the internal pressure of the tube is limited to about 2 to about 3 kg/cm$^2$, whereas the highest temperature available at this pressure level is only about 120° to about 130° C. Thus, steam is not usable for plastic tubes of relatively high softening point, such as polytetrafluoroethylene tubes. Moreover, there arises a need to install a boiler and other equipment attached thereto, hence an increased equipment cost.

DISCLOSURE OF THE INVENTION

An object of the present invention is to provide a method of lining a pipe with a rigid or semi-rigid plastic tube by enlarging the tube, the method being adapted to enlarge the plastic tube smoothly progressively from its starting end toward the terminal end thereof.

Another object of the invention is to provide the lining method stated above which is not limited substantially in heating temperature, permitting use of plastic tubes ranging from low to high in softening point.

Another object of the invention is to provide the lining method described which can be practiced efficiently with high safety.

Still another object of the invention is to provide the lining method described which can be practiced by simple procedure and device.

Other features of the invention will become apparent from the following description.

The present invention provides a method of lining a pipe with a rigid or semi-rigid plastic tube inserted in the pipe by enlarging the tube from inside thereof with application of heat and pressure, the method being characterized by:

(i) applying heat and pressure to and enlarging the plastic tube from inside thereof by an electrically heatable enlarging pig moved through the plastic tube as placed therein, (ii) retaining the plastic tube in shape as enlarged by the enlarging pig with compressed air supplied to the interior of the plastic tube as the tube is enlarged, and (iii) preheating the unenlarged portion of the plastic tube by passing a portion of the compressed air within the enlarged tube portion through heating channels of the enlarging pig to heat the air portion and introducing the heated air portion into the unenlarged tube portion as a heat flow.

The method of the present invention is used for repairing the inner surfaces of underground water supply pipes, underground town gas pipes, interior gas piping, hot fluid conduits, exhaust pipes and the like.

The plastic tube to be inserted into the pipe to be repaired must be thermoplastic so as to be enlarged with heat and pressure from inside. For example, tubes of polyvinyl chloride, polyethylene, polypropylene or like material are usually used. For lining exhaust ducts or the like which must be resistant to heat and chemicals, it is desirable to use tubes made of a material, such as polytetrafluoroethylene, which has high resistance to heat and chemicals. To eliminate the need to use an adhesive for lining, the plastic tube is required to have shape retentivity and is therefore rigid or semi-rigid.

The plastic tube is shaped in a circular cross section so as to retain a circular cross section with good stability after enlargement. For example, a plastic tube of elliptical cross section, even if so enlarged as to have a circular cross section, tends to spontaneously revert to the elliptical cross section since the tube is enlarged at a temperature below its melting point. Such a tube is not desirable because a clearance will then be formed inside the pipe of circular cross section around the tube.

The plastic tube has an outside diameter which is approximately equal to or smaller than the inside diameter of the pipe to be repaired. It is likely that difficulties will be encountered in inserting the tube into the pipe if the outside diameter is excessively large or in enlarging the tube because of a great ratio of enlargement if the outside diameter is conversely too small, so that the outside diameter is suitably about 50 to about 70% of the inside diameter of the pipe.

The plastic tube needs to have such a wall thickness that when made into a lining, the tube retains the original shape and the strength required of the lining without the application of any adhesive. For use with a pipe having an inside diameter of 300 mm, for example, the proper wall thickness is selected from the range of about 1 to 10 mm according to the ratio of enlargement, outside diameter, material, etc.

The length of the plastic tube is greater than the span of the pipe to be repaired and is about 3 to 10 m if shortest or about 100 to 150 m if long. When the plastic tube has a great length, it is desirable to radially collapse the tube to the shape of a belt and wind the tube around a drum or the like for transport to the site of application.

The plastic tube retaining a circular cross section or as radially collapsed to the shape of a belt is inserted into the entire length of the desired pipe. When the plastic tube is in the form of a belt, the flexibility afforded by the inherent elasticity of plastics enables the tube to be smoothly inserted into the pipe even if the pipe has an intermediate bent portion. When the plastic tube as deformed to the shape of a belt and wound around a drum or the like is to be inserted into the pipe, the tube may be softened by heating at the site of application to eliminate the resulting curl. When the plastic tube as deformed to the belt shape is to be inserted into a pipe having an intermediate bent portion, the tube is likely to become difficult to insert when buckled at the bent portion. To preclude such buckling, a linear spring member may be inserted into the plastic tube to internally back up the tube for reinforcement.

Such a deformed plastic tube is obtained from a plastic tube shaped to have a circular cross section by deforming the tube to the shape of a belt at room temperature or as softened by heating. Accordingly, the tube can be readily restored to its original circular cross section when subjected to heat and pressure from inside.

To radially enlarge the plastic tube inserted in the pipe from inside the tube, an electrically heatable enlarging pig is placed in the plastic tube.

The enlarging pig is provided with an electric heater as heating means and a thermocouple for controlling the temperature.

In view of the movability of the enlarging pig through the tube, the pig is suitably in the form of a sphere or cone and has an outside diameter approximately equal to or slightly smaller than the inside diameter of the lining to be obtained by radially enlarging the plastic tube.

The enlarging pig is controlled to a temperature at least not lower than the softening point of the plastic tube. In some cases, the pig may be controlled to a temperature not lower than the melting point of the plastic tube.

In the case where the enlarging pig is controlled to a temperature not lower than the softening point of the plastic tube but below the melting point thereof, the speed of movement of the pig through the tube is not limited specifically insofar as the plastic tube can be softened by heating to a state in which it can be enlarged.

If the speed of travel of the pig through the tube is very low in the case where the temperature of the enlarging pig exceeds the melting point of the plastic tube, the tube is likely to melt owing to heating, failing to retain its shape, so that there arises a need to control the speed of movement of the pig to a relatively high value to avoid melting.

The enlarging pig is moved through the tube, for example, by pulling a rope attached to the pig. Alternatively, the pig may be moved utilizing the pressure of compressed air supplied to the tube as described below, with a rope attached to the enlarging pig and used for braking.

The plastic tube mechanically enlarged with the movement of the enlarging pig through the tube is further enlarged and, at the same time, held enlarged by the pressure of a fluid. For this purpose, compressed air is supplied to the enlarged portion of the plastic tube while the tube is being continuously enlarged by the pig.

The interior of the enlarged portion of the plastic tube is held pressurized by the supply of compressed air. In conformity with the lining conditions, etc., a suitable internal pressure of the tube is selectively determined from the range, for example, of from about 0.2 to 0.5 kg/cm$^2$ (guage pressure) so that the plastic tube as mechanically enlarged can be further enlarged immediately thereafter by the fluid pressure.

To preheat the unenlarged portion of the plastic tube toward the direction of advance of the enlarging pig, the enlarging pig has at least one air channel extending therethrough axially of the tube. A portion of the compressed air is heated by the heater provided on the pig when passing through the channel of the pig and is injected into the unenlarged plastic tube portion as a heat flow to preheat the tube portion. By virtue of this preheating, the plastic tube can be enlarged by the pig smoothly without objections. This serves to increase the speed of movement of the pig through the tube to achieve an improved work efficiency.

With the method of the invention, the rigid to semirigid plastic tube inserted in the pipe is enlarged progressively from the starting end toward the terminal end with the travel of the electrically heatable enlarging pig. As the tube is progressively enlarged, air is effectively driven out from the space between the plastic tube and the pipe, with the result that a tubular lining can be obtained with a high quality without trapping any air. Since the unenlarged tube portion toward the direction of advance of the pig is preheated with the compressed air which is injected thereinto while being heated by the electric heater on the pig, the pig is smoothly movable to form the tubular lining efficiently.

The enlarging pig, which is electrically heatable, is substantially not limited in the heating temperature and is therefore usable free of trouble for plastic tubes ranging from low to high in softening point. Furthermore, the electric heating is more advantageous than heating with steam in assuring the safety of operation, does not require the installation of any boiler and therefore serves to simplify the device and operation needed.

BRIEF DESCRIPTION OF THE DRAWINGS

FIGS. 1 to 4 are diagrams showing the method of the invention stepwise as it is used for lining a straight pipe; FIG. 7 is a diagram showing an exemplary mode of the method of the invention for use in lining a pipe having bent portions; FIG. 8 is a diagram showing the pipe as completely lined; FIGS. 9 and 10 are diagrams showing how to deform plastic tubes to two different beltlike forms; FIG. 11 is a diagram schematically showing a plastic tube as buckled when inserted into a bent pipe portion; FIG. 12 is a view in vertical section of FIG. 11; FIG. 13 is a diagram schematically showing a tube as inserted through a bent pipe portion in a preferred mode according to the method of the invention; FIG. 14 is a view in vertical section of FIG. 13; FIG. 15 is a side elevation showing a preferred example of linear spring member for backing up the plastic tube to be inserted; FIG. 16 is a rear view of the same; FIG. 17 is an enlarged view showing a riveted portion; FIGS. 18 and 19 are enlarged fragmentary views in section showing corrugations formed.

BEST MODE OF CARRYING OUT THE INVENTION

Exemplary modes of method of the present invention will be described below with reference to the accompanying drawings.

FIGS. 1 to 4 show an example of method of the invention stepwise as it is used for lining a straight pipe.

Figure 1:
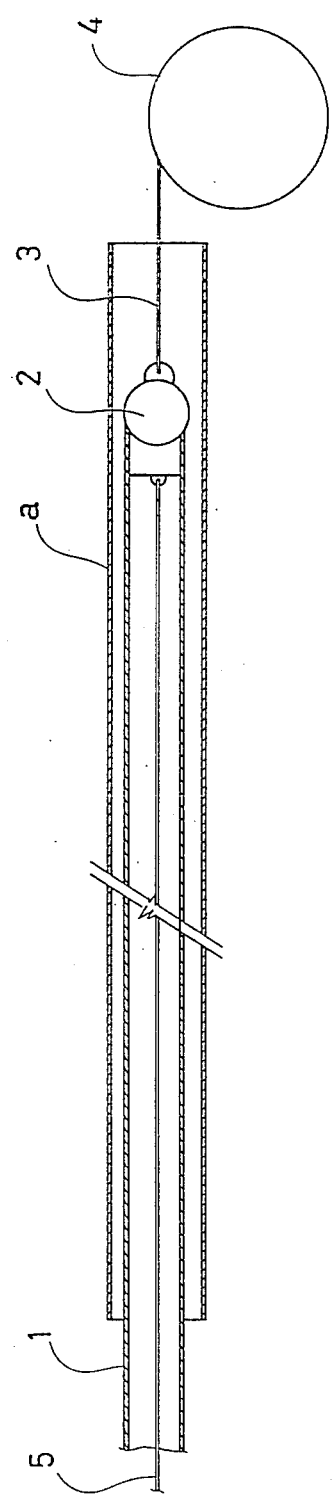

FIG. 1 schematically shows the step of inserting a plastic tube 1 into the straight pipe a to be lined. In this inserting step, a pulling rope 3 inserted through the pipe a is connected at its one end to the forward end of the plastic tube 1 by a joint member 2, and the other end of the rope 3 is wound around a winch 4 installed outside the pipe a. As the rope 3 is wound up by the operation of the winch 4, the plastic tube 1 is inserted into the pipe a and is finally inserted over the entire length thereof into the pipe. The plastic tube 1 has a wire 5 inserted therethrough in advance for use in the next step.

The plastic tube 1 is made of a rigid to semi-rigid thermoplastic plastics, is circular in cross section and has an outside diameter corresponding to about 50 to 70% of the inside diameter of the pipe a.

Figure 2:
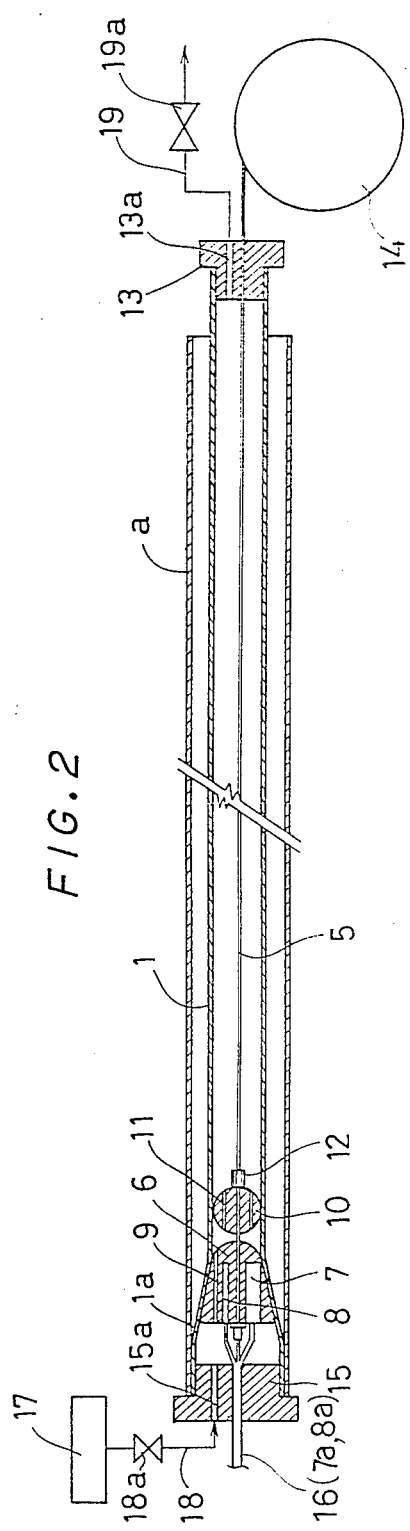

FIG. 2 shows a preparatory step before the start of lining. In this preparatory step, the staring end of the plastic tube 1 at the starting end of the pipe a is pre-enlarged to the same diameter as the pipe a by suitable means, and an electrically heatable enlarging pig 6 is placed into the enlarged tube portion 1a.

Figure 6:
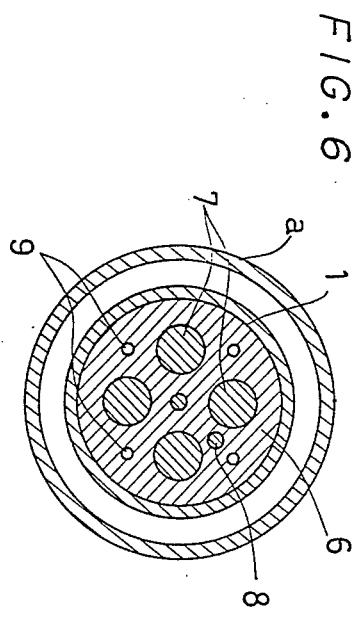
FIG. 6 is a view in section taken along the line VI—VI in FIG. 5.
Figure 5:
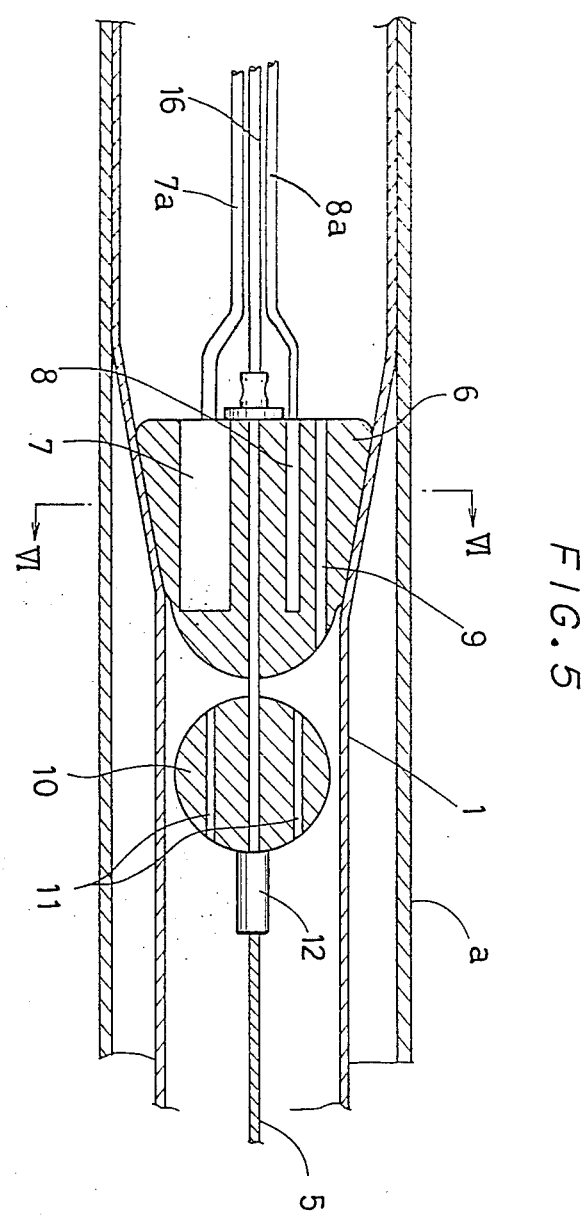
FIG. 5 is an enlarged view in vertical section of an electrically heatable enlarging pig for use in practicing the method of the invention.

FIGS. 5 and 6 show the enlarging pig 6 in detail. The pig 6 is made of stainless steel or like metal, is provided with an electric heater 7 serving as electric heating means and a thermocouple 8 serving as temperature control means, and has air heating channels 9 positioned close to its outer periphery and extending through the pig axially of the tube. For example, four channels are provided at a spacing of 90 degrees (see FIG. 6).

The enlarging pig 6 can be provided at its forward end with an auxiliary pig 10, which is similarly formed with air channels 11. The auxiliary pig 10, which serves to guide the enlarging pig 6 through the plastic tube 1, has an outside diameter approximately equal to or slightly smaller than the inside diameter of the plastic tube 1.

With reference to FIG. 2, the enlarging pig 6 placed in the enlarged tube portion la is connected at the forward end of the auxiliary pig 10 to one end of the wire 5 inserted through the plastic tube 1 in advance, by a connector 12. The other end of the wire 5 freely extends through a terminal-end plug 13 closing the terminal end opening of the plastic tube 1 and is wound up on a winch 14 provided outside the pipe a. The opening of the enlarged tube portion 1a is closed with a starting-end plug 15. Cords 7a, 8a attached to the electric heater 7 and the thermocouple 8 freely extend outward from the tube through the plug 15 along with a reinforcing rope 16. These cords 7a, 8a are connected to a power supply and a temperature control unit (not shown), respectively.

With the enlarging pig 6 maintained at a temperature not lower than the softening point of the plastic tube 1 in the state shown in FIG. 2, compressed air is supplied from a compressor 17 into the enlarged tube portion 1a through an air conduit 18 and then through a supply bore 15a in the starting-end plug 15, whereupon a portion of the supplied air is heated while passing through the channels 9 of the enlarging pig 6 and flows into the unenlarged portion of the plastic tube 1 from the outlets of the channels 9 as a heat flow to preheat the unenlarged tube portion. The air is discharged from the tube through an outlet 13a in the terminal-end plug 13 and a discharge pipe 19 connected thereto. The rate of supply of the compressed air is adjusted by a valve 18a on the air conduit 18, and the rate of discharge thereof by a valve 19a on the discharge pipe 19. The internal pressure of the plastic tube 1 is maintained, for example, in the range of about 1.0 to 1.5 kg/cm$^2$ (guage pressure) when the tube is made of polytetrachloroethylene.

FIG. 3 shows the step of lining the plastic tube. In the lining step, the enlarging pig 6 is moved through the plastic tube 1 from its starting end toward the terminal end thereof by the wire 5 wound up by the winch 14 while maintaining the enlarging pig 6 at a specified temperature by heating with the electric heater 7 and the interior of the enlarged tube portion 1a at a specified pressure by the supply of compressed air and further while preheating the unenlarged tube portion with a portion of the compressed air heated by passing through the channels 9 of the pig 6, the heated air portion flowing into the unenlarged tube portion as already described with reference to the preceding preparatory step, whereby the unenlarged portion of the plastic tube 1 is mechanically enlarged radially thereof while being softened by heating with the pig 6 as the pig 6 moves through the tube. The portion 1b of the plastic tube 1 immediately after being mechanically enlarged by the pig 6 still remains softened and is therefore further enlarged into pressing contact with the inner surface of the pipe a by being subjected to the pressure of the compressed air within the enlarged tube portion 1a. The enlarged portion is thereafter held thus pressed against the tube surface by the internal air pressure of the enlarged tube portion 1a.

The plastic tube 1 can be held to the inner surface of the pipe a while being enlarged progressively from its starting end toward the terminal end thereof by such combination of the enlarging pig 6 for mechanical enlargement and the air pressure for enlargement, whereby an inner lining 1' in the form of the enlarged plastic tube 1 can be formed over the entire length of the pipe a.

With the method of the invention, the plastic tube 1 can be subjected to heat and pressure and enlarged by the pig 6 while preheating the unenlarged tube portion utilizing part of the compressed air which is heated when passing through the channels 9 of the pig 6, with the result that although depending on operation conditions, the speed of movement of the pig 6 through the tube can be at least about 30 to about 50% higher than when the tube portion is not preheated. Furthermore, the unenlarged tube portion of the plastic tube 1 can be preheated without using additional means and therefore without necessitating more complex operation and device.

FIGS. 7 and 8 show an example wherein the method of the invention is employed for lining a pipe having bent portions.

FIG. 7 shows the step of lining the pipe, and FIG. 8 shows the lining formed. The pipe is lined substantially in the same manner as the straight pipe already described except that the following expedients are used for inserting a plastic tube 1 into the pipe a since the pipe a has the bent portion a1. Throughout FIGS. 1 to 8, like parts are designated by like reference numerals or symbols. The plastic tube 1 to be used in the method of the invention for lining pipe a is rigid to semi-rigid, is therefore low in flexibility when retaining a circular cross section and can not be passed through the bent portion a1 of the pipe a. Before insertion into the pipe a, accordingly, the plastic tube 1 is radially collapsed to the shape of a belt as seen in FIGS. 9 and 10. The deformation to the belt shape and the inherent resiliency of the plastics render the deformed plastic tube 1A bendable in the directions of arrow 20 in FIG. 9 as desired, whereby the belt can be passed through the bent tube portion a1.

The plastic tube 1 can be deformed to the belt shape by a working device 21 shown in FIG. 9 and including three rolls 21a, which are each provided with heating means for shaping the plastic tube 1 to a belt form while softening the tube by heating.

When the plastic tube 1 has an outside diameter which is about 50 to 70% of the inside diameter of the pipe a, the tube 1 can be made insertable through the pipe a when merely collapsed in one direction radially of the tube as seen in FIG. 9, whereas if the outside diameter exceeds 70% of the inside diameter of the pipe a, there arises a need to fold the belt-shaped tube in two as shown in FIG. 10 to render the tube insertable through the pipe a.

When the plastic tube 1A deformed to the belt shape is inserted into the pipe a having the bent portion a1, it is likely that the plastic tube 1A will be buckled as at 22 as shown in FIG. 11 when passing through the bent portion a1. The buckled portion 22 formed poses no problem when the plastic tube 1A is inserted into the pipe a only by being pulled in with a pulling rope 3, but the portion 22 presents a problem if the tube is pulled in with the rope 3 and also pushed in, or if it is only pushed in from one side. More specifically, if the buckled portion 22 occurs in the plastic tube 1A, the pushing-in force escapes through the buckled portion 22 almost without being delivered further forward.

In the method of the present invention, the deformed plastic tube 1A can be prevented from buckling as at 22 at the bent pipe portion a1 when inserted into the pipe, by inserting a linear spring member 23, for example, of spring steel through the plastic tube 1A over the entire length thereof as seen in FIGS. 13 and 14 and resorting to the backing-up effect of the linear spring member 23.

Examples of useful linear spring members 23 are a strip of steel, and an assembly of superposed steel strips 23a increasing stepwise in the number of strips longitudinally of the assembly as shown in FIGS. 15 to 17.

We have investigated the amenability of the steel strip 23a to the pipe a having a bent pipe portion a1 and found the following. A reduced thickness results in reduced bending resistance at the bent pipe portion but a shortened distance of transmission of the pushing-in force, whereas a larger thickness entails a longer distance of transmission of the pushing-in force but higher bending resistance at the bent pipe portion, this tendency becoming more pronounced toward the forward end.

When the plurality of steel strips 23a are used as superposed in layers with the number of strips increasing stepwise longitudinally of the assembly as seen in FIGS. 15 to 17, the thickness of the assembly decreases toward its forward end, which therefore can be improved in bending resistance. Since the thickness increases toward the base end where the assembly is pushed in, the pushing-in force can be transmitted efficiently to the forward end, and the problem as to the transmission distance can also be obviated completely.

The steel strip 23a encounters a problem in transmitting the pushing-in force when having too small a thickness or in bendability when having an excessive thickness, so that for example for use with pipes up to 50 mm in inside diameter, the thickness is suitably 0.4 to 1.0 mm, more suitably about 0.6 to 0.8 mm. Further preferably, the steel strip has the greatest possible width insofar as it is insertable through the deformed plastic tube 1A to be used. The maximum number of superposed steel strips 23a, which should not exceed the width of the strips, is suitably selectively determined usually from the range of about 5 to 10, for example, according to the length of the pipe. The length of the first step (single layer), the second step (double layer) and like steps is suitably determined in accordance with the number of superposed layers and the length of the pipe and is usually 50 cm or greater. While the steps are usually approximately equal in length, the length, for example, may be increased or decreased toward the base end, that is, as the number of superposed layers increases.

The superposed steel strips 23a are fastened together by a rivet 24 or some other suitable fastening means at one end of each step. Since the superposed steel strips 23a tend to be displaced from one another when bent, it is desirable to make the diameter L of the hole larger than the shank diameter l of the rivet 24 as seen in FIG. 17 so as to accommodate the displacement by a loose fit.

The bent pipe portion a1 has a considerable difference between the outside and inside thereof in the radius of curvature, so that when the pipe a having the bent pipe portion a1 is lined with the plastic tube 1 by the method of the invention, the lining is liable to wrinkle as indicated at 1d at the inside portion a'1 of smaller radius of curvature as shown in FIG. 8. The wrinkling can be diminished by using a plastic tube 1 having a relatively small outside diameter corresponding to about 50 to 70% of the inside diameter of the pipe a and so dimensioned as to be enlarged relatively greatly into pressing contact with the inner surface of the pipe.

In forming a lining 1' on the inner surface of a pipe a with a rigid plastic tube 1 inserted through the pipe a by mechanically enlarging the tube 1 with the enlarging pig 6 movable through the tube and also enlarging the tube with the pressure of compressed air supplied to the interior of the enlarged portion of the tube 1, the lining 1' can be corrugated as at 1a' as shown in FIGS. 18 and 19 by practicing the method of the invention under such conditions that the tube is enlarged with the fluid pressure to great and small ratios alternating at a suitable interval.

FIGS. 18 and 19 show an example of such corrugated portion 1a' formed by varing the enlarging pressure of compressed air within the tube alternately between a maximum level and a minimum level at a suitable interval.

FIG. 18 shows the tube with its interior maintained at the maximum pressure. The enlarged portion 1b of the plastic tube still remaining softened immediately after the mechanical enlargment by the pig 6 is subjected to the maximum internal pressure and thereby further enlarged, for example, almost into contact with the inner surface of the pipe a, whereby a ridge of the corrugated portion 1a' is formed. The portion enlarged with the fluid pressure is then solidified by the cooling action of air within the tube and thereafter remains enlarged.

FIG. 19 shows the tube as maintained at the minimum internal pressure. Immediately after having been mechanically enlarged by the pig 6, the enlarged portion 1b still remains softened, but the minimum internal pressure held, for example, as low as about 10 to 40% of the maximum pressure almost fails to enlarge the tube portion, with the result that the plastic tube 1 remains as mechanically enlarged by the pig 6. Thus, a furrow of the corrugated portion 1a' is formed.

The corrugated portion 1a' can be formed in the lining 1' by applying the maximum and minimum pressures alternately at a suitable interval.

Such a corrugated portion 1a' can also be formed, for example, by varying the temperature of heating with the enlarging pig or the speed of movement of the pig through the tube alternately between two different values at a suitable interval.

The corrugated portion 1a' formed in the lining 1' enables the lining 1' to retain stretchability. The pipe a is made usually of a metal, such as iron or copper, which differs considerably in coefficient of linear expansion from the plastics forming the lining 1'.

Figure 21:
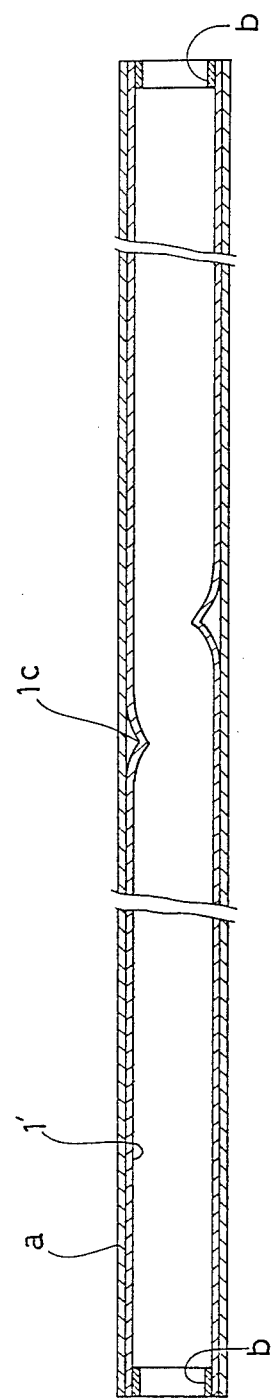
FIG. 21 is a sectional view showing a tube as buckled.
Figure 20:
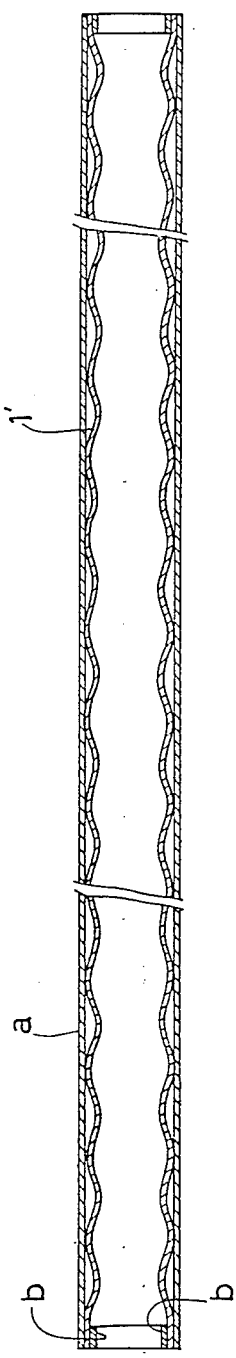
FIG. 20 is a sectional view showing a corrugated lining.

With reference to FIG. 20, opposite ends of the lining 1' are usually fixed to the repsective openings of the pipe a with end rings b, b. Accordingly, in climates involving a great temperature difference, for example, between day and night or summer and winter, the lining 1' stretches or contracts relative to the pipe a owing to the difference in coefficient of linear expansion therebetween. For example, when the lining stretches, a buckle 1c develops as shown in FIG. 21. Such buckling 1c can be precluded by the stretchability imparted to the lining 1' by the corrugated portion 1a'.

Given below are examples of experiments on the method of the invention. The experiments were conduction on straight pipes having a length of 10 m. A smooth lining was formed on the pipe in Experimental Example 1, and a corrugated lining in Experimental Example 2.

Experimental Example 1

Conditions for Experiment

| Pipe | 34 mm in inside diameter |
|---|---|
| Rigid plastic tube | |
| Outside diameter: | 23 mm |
| Material: | polytetrafluoroethylene |
| Sectional form: | circular |
| Softening point: | 260° C. |
| Melting point: | 327° C. |
| Enlarging Pig | |
| Maximum diameter: | 27.5 mm |
| Temperature: | 400–450° C. |
| Speed of movement through tube: | 70–100 mm/min |
| Pressure within tube | |
| Internal pressure: | 1.0–1.2 kg/cm² (constant) |
| Preheating air | |
| Temperature: | 180–250° C. (as discharged from pig) |
| Rate: | 20–30 liters/min |

When the present method was practiced under the above conditions, a lining (wall thickness: 1.0 mm) of high quality was obtained free of cracking without trapping air.

Experimental Example 2

The present method was practiced under the same conditions as in Experimental Example 1 with the exception of the following conditions, whereby a corrugated lining was obtained with a corrugation pitch of 50 mm.

Pressure within tube

Speed of movement of pig through tube: 75 mm/min
Maximum pressure: 1.2 kg/cm²
Minimum pressure: 0.9 kg/cm²
Interval of alternation of max. and min. pressures: 20 sec While the invention has been particularly shown and described in reference to preferred embodiments thereof, it will be understood by those skilled in the art that changes in form and details may be made therein without departing from the spirit and scope of the invention.

We claim:

1. A method of lining a pipe with a plastic tube, comprising the steps of:
   placing the plastic tube within the pipe to be lined, the plastic tube having a diameter smaller than that of the pipe;
   placing a substantially conical pig within the plastic tube at one end thereof, the conical pig having a heater and a through-hole air channel therein;
   heating the conical pig by the heater;
   supplying an air flow into the inside of an unexpanded portion of the tube ahead of the conical pig has been inserted through the through-hole air channel of the conical pig such that the air flow is heated by heat of the heated conical pig and the resulting heated air flow preheats the unexpanded portion of the tube; and
   moving the conical pig along an axial direction of the plastic tube such that the conical pig heats the tube and physically expands the heated tube to line the tube against an inside of the pipe.

2. A pipe lining method as defined in claim 1, wherein the step of placing the plastic tube within the pipe includes the step of placing a rigid to semi-rigid plastic tube which is circular in cross section.

3. A pipe lining method as defined in claim 2, wherein the step of placing the rigid to semi-rigid plastic tube includes the step of radially collapsing the rigid to semi-rigid plastic tube of circular cross section to the shape of a belt and the step of inserting the radially collapsed plastic tube into the pipe.

4. A pipe lining method as defined in claim 3, further comprising the steps of inserting a linear spring member through the plastic tube deformed to the belt shape and over the entire length thereof and inserting the plastic tube into the pipe while being backed up with the linear spring member from inside.

5. A pipe lining method as defined in claim 4, wherein the step of inserting a linear spring includes the step of inserting a linear spring member having a strip of steel.

6. A pipe lining method as defined in claim 5, wherein the step of inserting the linear spring includes the step of inserting a linear spring member having a plurality of superposed steel strips and increases stepwise in the number of steel strips from the forward end toward the base end thereof.

7. A pipe lining method as defined in claim 1, wherein the step of moving the pig includes the step of pulling the enlarging pig through the tube by a pulling rope.

8. A pipe lining method as defined in claim 1, wherein the step of moving the pig includes the step of moving the enlarging pig through the tube with compressed air supplied to the enlarged tube portion.

9. A pipe lining method as defined in claim 1, further comprising the step of enlarging the plastic tube softened by heating under the condition that the tube is radially enlarged to a ratio varying between a large value and a small value alternately at a suitable interval.

10. A pipe lining method as defined in claim 9, wherein the step of enlarging the plastic tube includes the step of varying internal pressure in the plastic tube for enlarging the plastic tube at a suitable interval between a maximum capable of enlarging the tube and a minimum substantially incapable of enlarging the tube or the step of permitting enlargement to a smaller ratio than a preceding ratio of enlargement.

* * * * *